United States Patent [19]

Grinberg et al.

[11] 4,107,977
[45] Aug. 22, 1978

[54] METHOD OF CHECKING THE VALVES OF AEROSOL CONTAINERS FOR TIGHTNESS AND AN APPARATUS FOR EFFECTING THE SAME

[76] Inventors: Ijun Iosifovich Grinberg, ulitsa Zavodskaya, 4a, kv. 44; Evgeny Kuzmich Zhukov, ulitsa Fevralskaya, 1, kv. 14, both of Klimovsk; Lev Nikolaevich Koshkin, Samotechny pereulok, 23, kv. 54, Moscow, all of U.S.S.R.

[21] Appl. No.: 715,570

[22] Filed: Aug. 18, 1976

Related U.S. Application Data

[63] Continuation of Ser. No. 511,463, Oct. 2, 1974, abandoned.

[51] Int. Cl.² ............................................. G01M 3/28
[52] U.S. Cl. .................................... 73/45.3; 73/46
[58] Field of Search ............... 73/41, 45, 45.1, 45.2, 73/45.3, 45.4, 52, 40, 46, 49.2, 49.3

[56] References Cited

U.S. PATENT DOCUMENTS

| | | | |
|---|---|---|---|
| 2,352,916 | 7/1944 | Schrader | 73/45.3 X |
| 2,863,316 | 12/1958 | Abplanalp | 73/45 |
| 2,959,050 | 11/1960 | Franch | 73/46 |
| 3,091,958 | 6/1963 | Robins | 73/45.2 |
| 3,413,841 | 12/1968 | Weber | 73/45.1 |
| 3,461,716 | 8/1969 | Thomson | 73/45.1 |
| 3,608,380 | 9/1971 | Muir et al. | 73/45.1 |

Primary Examiner—Richard C. Queisser
Assistant Examiner—John S. Appleman
Attorney, Agent, or Firm—Haseltine, Lake & Waters

[57] ABSTRACT

Apparatus for checking the valves of aerosol containers for tightness, in which a vacuum is produced under the valve being checked by pressing the valve by its shut-off member in the open position against a resilient member on a seat in order to deform the resilient member which, after removing the force of pressing and closing the valve, tends to return to the initial position, thereby increasing the volume of the cavity under the valve. This permits reducing the time of exposing the valve to the vacuum. The seats are made blind and are arranged on an endless conveyor which moves the seats with the valves to the mechanisms effecting the operations.

9 Claims, 14 Drawing Figures

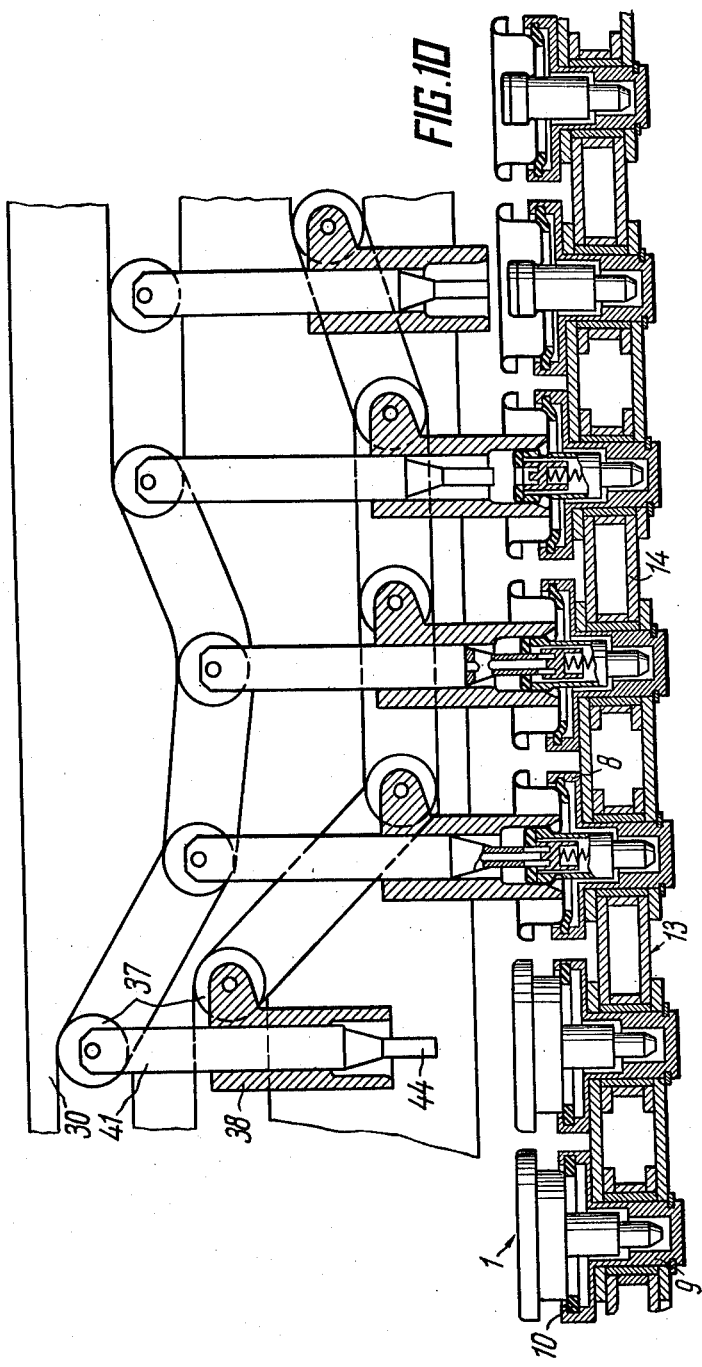

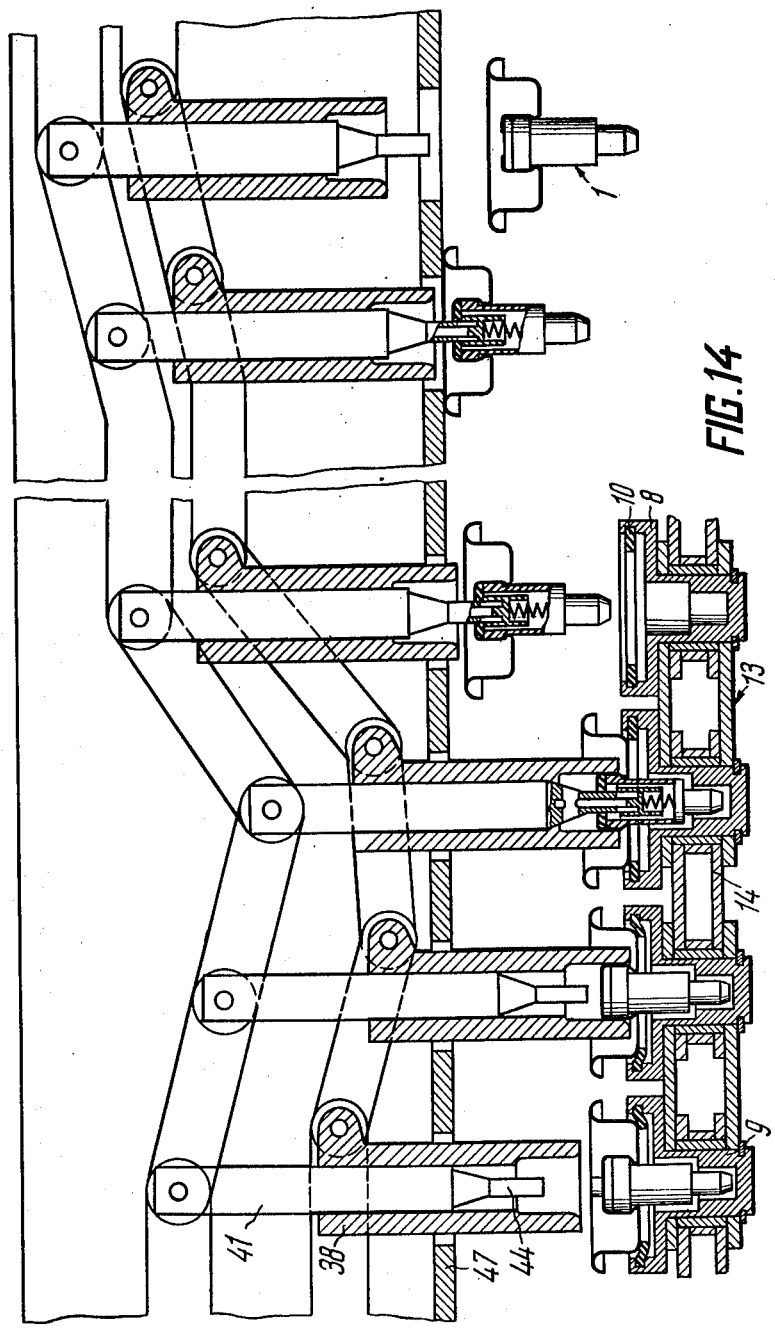

METHOD OF CHECKING THE VALVES OF AEROSOL CONTAINERS FOR TIGHTNESS AND AN APPARATUS FOR EFFECTING THE SAME

This Application is a continuation of Ser. No. 511,463 filed Oct. 2, 1974 and now abandoned.

FIELD OF THE INVENTION

The present invention relates to methods and apparatus for checking valves, and more particularly to methods of checking the valves of aerosol containers for tightness and apparatus for effecting the same.

This invention may be used in the chemical industry, in the perfumery and other industries in which various products are produced in aerosol containers.

BACKGROUND

Known in the prior art is a method in which a valve having a housing with a shut-off member is placed into the seat of a tightness checking apparatus, said seat having a resilient member disposed around its periphery, and the valve housing is pressed against the resilient member, then a vacuum is created in the seat cavity under the valve which is exposed to the vacuum during a time interval required for checking the valve, whereupon a force is applied to the valve in a direction opposite to the force of pressing, said force being slightly higher than the valve weight, and faulty valves are removed under the action of said force from the seats while sound valves are conveyed further to a station where they are removed from the seats.

Also known in the art is an apparatus for effecting said method, comprising a bed with a driving shaft vertically disposed thereon, and a rotor mounted on the shaft. Seats for the valves to be placed therein are rigidly secured on the rotor, being evenly spaced around the rotor circumference. The valves are checked together with spray heads fitted therein. The upper portion of each seat is provided with a resilient member shaped as a ring which ensures a tight contact between the seat and the valve housing. Mounted under each seat is a means for creating vacuum in the seat cavity under the valve. This means is essentially a cylinder with a piston, communicating through a channel with the seat cavity. The total space of the seat cavity under the valve, the communicating channel and the cylinder space between the piston in the initial position and the cylinder end is the initial volume of the cavity under the valve to be checked.

A train of levers links the piston with a cam mounted on the bed. When the rotor with the seats is rotated, the configuration of the cam determines the amount of the piston displacement.

Mounted over each seat in the rotor is a means for placing the valve into the seat, pressing the valve against the seat resilient member, opening the valve, and removing the valve from the seat. The means for pressing the valve against the seat and removing it from the seat includes a lever whose pin is secured to the rotor, while the means for opening the valve prior to its removal from the seat is mounted on the lever itself.

The vacant end of the lever carries a spring-biased magnet mounted thereon for picking up valves to be checked from a trough which is located somewhat higher than the seat, in a direction radial with respect to the rotor. In addition, mounted on the lever end is a stem for opening the valve by pressing the head thereof.

Each seat is provided with a pipeline to supply compressed air to the valves with faulty spray heads which remain in the rotor seats after the sound valves have been removed.

Each seat with the means associated therewith for effecting the operations described above make-up an operating position of the rotor.

All means of the operating positions are set in action each by their own cam.

The cam configuration actuating the lever for pressing the valves against the seat resilient member is profiled so as to ensure lowering of the lever after the magnet has picked up the next valve in turn from the supply trough, holding the lever in the lower position when vacuum is created in the cavity under the valve and exposure of the valve to the vacuum, lifting the lever to remove a faulty valve from the seat, lowering and holding the lever in the lower position during the stem operation which opens the valve, lifting the lever with the magnet to remove a tight valve with a sound head from the seat, holding the lever in the upper position to transfer the removed valve into the receiving trough and to eject the valve with a faulty head by compressed air from the seat into a corresponding trough, as well as for picking up another valve to be checked by the magnet from the supply trough.

The cam configuration actuating the piston to create vacuum in the cavity under the valve is profiled so as to ensure displacement of the piston in the cylinder immediately after the valve has been pressed against the seat resilient member and to return the piston to the initial position upon extracting the tight valve with sound head from the seat.

The cam configuration actuating the stem to open the shut-off member of the valve is profiled so as to ensure the stem stroke required for opening the valve and holding it in this position for a period of time sufficient for air to pass into the cavity under the valve prior to removing the tight valve from the seat.

The prior art apparatus for checking valves for tightness described above operates as follows.

The driving shaft mounted on the bed continuously rotates the rotor together with the operating positions. The magnet mounted on the lever end picks-up a valve to be checked from the supply trough and places it on the rotor seat. Then the same magnet which is a part of the means for pressing the valve presses the valve housing against the seat resilient member. Simultaneously, the piston of the means for creating vacuum in the seat cavity under the valve is displaced in the cylinder, acted upon by its own cam. Therefore, a vacuum is created in the seat cavity under the valve. The valve is further moved together with the rotor during a time period required for changing the degree of vacuum in the cavity under the valve if the latter is faulty. The amount of this time is directly proportional to the volume of the cavity under the valve. In the prior art apparatus, this volume includes the space of the seat cavity under the valve, the space of the communicating channel, and the space of the cylinder of the means for creating the vacuum, the space of the seat cavity itself being several times smaller than the total space of the channel and the cylinder space. During the entire period of exposing the valve to the vacuum, the spring-biased magnet on the lever end according to the configuration of the cam controlling said magnet is held in the extreme lower position, pressing the valve against the seat resilient member. At the same time, all other means of the operating position of each seat are moved together with the rotor taking no part in operation.

After the exposure time is over the lever is pivoted around its pin. The lever end with the magnet mounted thereon is lifted upward to extract the valve being checked from the seat.

If the valve is tight, it is held in the seat by the atmospheric pressure and the force of the magnet is not sufficient to extract it from the seat. If the valve is faulty, there is practically no vacuum in the seat cavity under the valve, thus enabling the magnet to extract such a valve and transfer it to the trough for rejected valves which is mounted slightly higher than the seat in a direction radial with respect to the rotor. The tight valves remain in the seats and are moved further together with the rotor. During this movement the lever acted upon by the cam is lowered and the spring-biased magnet comes into contact with the valve housing while the stem of the means for opening the valve depresses the valve spray head thereby opening the valve.

When the head is in proper condition, the air passes into the cavity under the valve, eliminating the vacuum therein. A faulty head does not let the air pass and the valve remains held in the seat by the atmospheric pressure.

After the pressure in the cavity under the valve becomes equal to the atmospheric pressure, the lever is pivoted around its pin. The lever end with the magnet is lifted upward. The valves with sound heads are extracted by the magnets from the seats and transferred into the trough for sound valves.

The valves with faulty heads which failed to admit air into the cavity under the valve are not extracted by the magnets and are moved further towards the compressed air pipeline where the valve is blown off into the trough for valves with faulty heads.

Then the cycle is repeated.

The known method of checking the valves for tightness has a number of disadvantages the main one of which is that the vacuum in the cavity under the valve is created by increasing its volume. This, in turn, requires a significant time of exposing the valve to vacuum since this time is directly dependent on the volume of the cavity under the valve.

In order to accomplish this method of creating a vacuum in the cavity under the valve, the prior art apparatus includes a means comprising a cylinder with a piston, communicated by a channel with the cavity of the seat intended for fitting therein the valve to be checked. The total volume of the cylinder and the communicating channel is several times larger than the volume of the cavity of the seat itself, whereby a significant time of exposing the valve to the vacuum is required because this time is directly proportional to the total volume of the space under the valve. This is one of the disadvantages of the known apparatus.

Another drawback of the known apparatus is that during the time of exposing the valve to vacuum all the means which are provided for each position of the rotor are standing idle. This drawback considerably limits the productivity of the known apparatus since it may be increased only by mounting additional operating positions onto the rotor which will require a large diameter of the rotor.

Still another disadvantage of the prior art structure consists in that a magnet is used for extracting faulty valves, thereby limiting the range of materials from which the valve housing could be manufactured.

SUMMARY OF THE INVENTION

It is an object of the present invention to provide a method of checking the valves of aerosol containers for tightness which reduces the time required for checking.

It is another object of the invention to provide an apparatus for checking the valves of aerosol containers for tightness which is comparatively simple in design, reliable in operation and has high productivity.

According to the present invention the above and other objects are accomplished in a method of checking the valves of aerosol containers, wherein the valve having a housing with a shut-off member is placed onto the seat of an apparatus for checking the valve for tightness, said seat having a resilient member around its periphery, the valve housing is pressed against the resilient member, vacuum is created in the seat cavity under the valve which is exposed to the vacuum during a time period required to check the valve, and a force is applied to the valve in a direction opposite to the force of pressing, said force slightly exceeding the valve weight and acting to remove faulty valves from the seats. In accordance with the invention, the vacuum under the valve to be checked is created by additionally pressing the valve housing with its shut-off member in the open position against the seat resilient member to further deform the latter, closing the valve after the pressure thereunder becomes equal to the atmospheric pressure followed by removing the force of pressure, whereby vacuum is created in the cavity under the valve.

This method of creating the vacuum under the valve permits of reducing the time exposing the valve to the vacuum.

In order to effect said method of checking the valves for tightness, proposed is an apparatus comprising, according to the present invention, two rotors mounted substantially in the same plane and each provided with a plurality of means for pressing the valve to be checked against the resilient member of the seat and for opening the valve, said means being uniformly spaced around the rotor circumference, and an endless conveyer carrying blind seats with said resilient members and conjugated with the two rotors so that as the conveyer moves the seats interact with said means to form operating positions, the rotor which as viewed along the direction of the conveyer movement forming is initially in positions in which the valve is pressed against the resilient member of the seat and the vacuum is created in the cavity of the seat under the valve, while the other rotor provides the positions for opening sound valves and removing them from the seats of the transporter whose length from the initial rotor to the other rotor is determined in a time period sufficient to change the degree of vacuum in the cavity of the seat under the faulty valve.

Due to the fact that the seats for placing the valves to be checked therein are blind, the volume of the cavity under the valve is minimized, thereby reducing several times the period of exposing the valve to the vacuum.

Moreover, the use of the blind seats considerably simplifies the general structure of the apparatus because it eliminates the necessity of keeping these seats in the rotor, with the result that the seats are taken out from the rotor for the period of exposing the valves to the vacuum, thereby permitting the removal of the means of each operating position for checking the next valve.

It is expedient that each seat be provided with a circular groove on the side surface thereof for disposing therein a peripheral portion of the resilient member made in the form of a ring.

With this embodiment of the resilient member and positioning thereof in the seat, a free portion, of the member is easily deformed when the valve housing is pressed against the resilient member, and tends to take the initial position upon removing the force of pressing.

In one of the embodiments of the present invention, the resilient member comprises several layers of materials of different elasticity, the layer of a higher elasticity being disposed in the place of contact between the resilient member and the valve, thereby contributing to a tighter contact between these items. The layer of a lower elasticity imparts rigidity to the resilient member necessary to create the degree of vacuum in the cavity under the valve larger than that with a single-layer member.

BRIEF DESCRIPTION OF THE DRAWINGS

The present invention will be further explained in detail with reference to the accompanying drawings, in which:

FIG. 10 is cyclogram of the rotor operation shown in FIG. 4;

FIG. 14 is a cyclogram of operation of the rotor depicted in FIG. 7.

DETAILED DESCRIPTION

Figure 1:
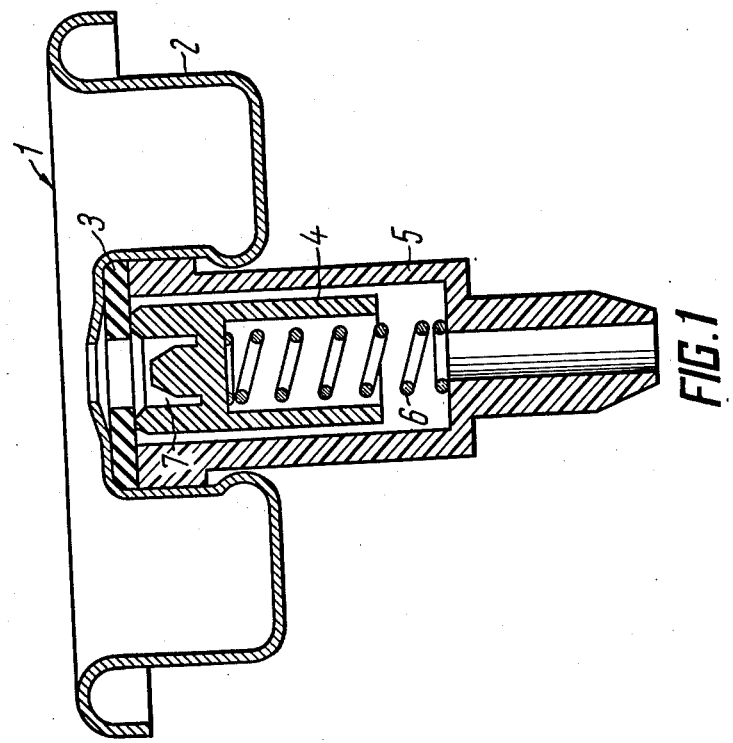
FIG. 1 is a longitudinal axial section of the valve of an aerosol container.

Referring now to the drawings, the proposed method is intended for checking valves 1 (FIG. 1) of aerosol containers for tightness. This valve comprises a housing 2 (FIG. 1) which is a cup-like thin-walled part with edges bent outwardly. In the bottom portion of the housing 2 there is a pocket directed inside the cup to receive therein a sealing ring 3 which is partially compressed by a stem 4 entering into the pocket from below (according to the drawing), said stem being essentially a shut-off member of the valve 1. Between the outer surface of the stem 4 and the pocket in the housing 2 a circular gap is formed in which partially enters a stepped cylinder 5 having a central opening 10 larger diameter portion which receives the stem 4. The bottom portion of the stem 4 is provided (according to the drawing) with a cylindrical recess which receives a spring 6 thrusting against the step of the opening in the cylinder 5. In the upper portion (according to the drawing) of the stem 4 there is a circular slot 7 adapted to receive therein a spray head (not shown) of the valve 1.

Figure 2:
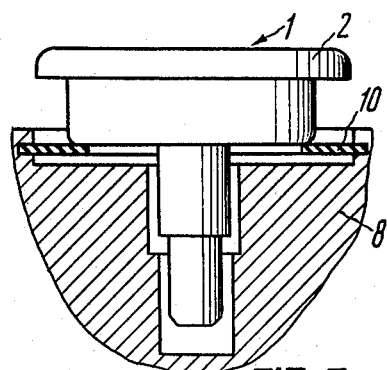
FIG. 2 shows schematically the valve placed on the seat of an apparatus for checking the valve for tightness.
Figure 4:
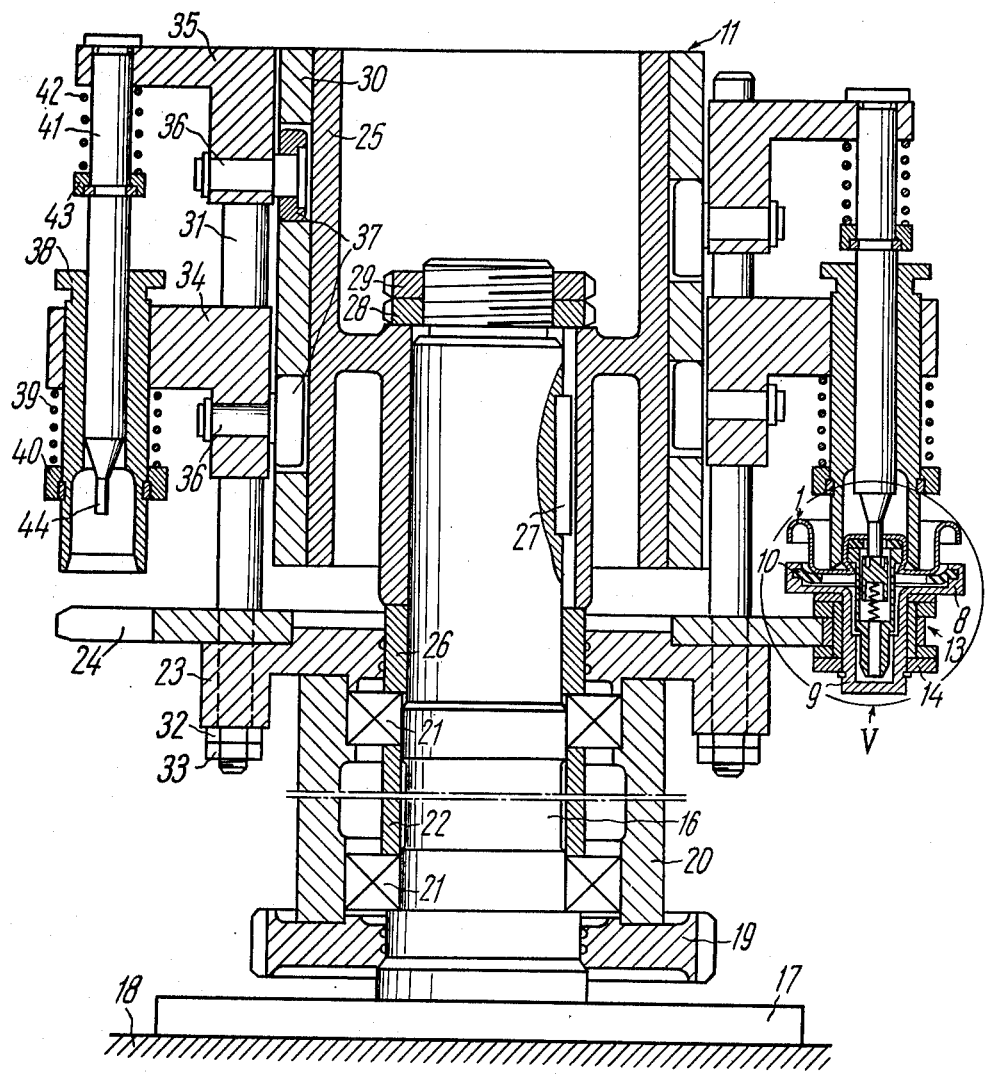
FIG. 4 is a sectional view taken along line IV—IV in FIG. 3.

In order to check the valve 1 for tightness, it is placed into a seat 8 (FIG. 2) whose configuration is similar to that of the lower portion of the valve 1 itself but is somewhat larger than that in volume. The seat 8 is made in a pin 9 (FIG. 4).

Disposed around the periphery of the seat 8 is a resilient member 10 against which the housing 2 of the valve 1 is pressed during the checking of the valve for tightness to create vacuum in the seat 8 under the valve 1.

Figure 3:
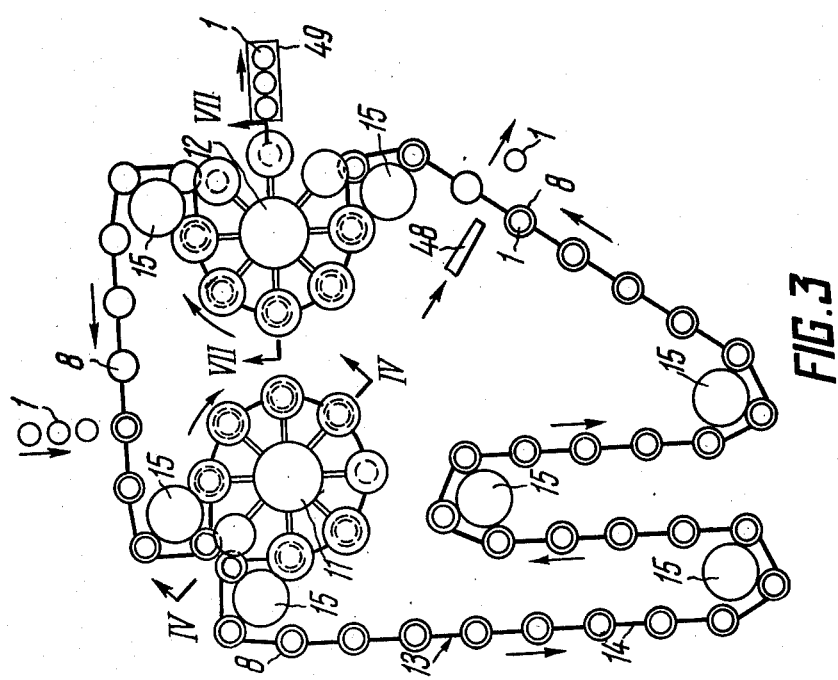
FIG. 3 is a schematic plan view of the apparatus for checking the valves for tightness.

The apparatus for checking the valves 1 of aerosol containers for tightness comprises (see FIG. 3) two rotors 11 and 12 which are mounted in the same plane, spaced at a certain distance one from the other and connected by an endless chain conveyer 13. Each link of a chain 14 of the conveyer 13 is connected to the adjacent links by means of the pin 9 in which the blind seat 8 is made. The length of the conveyer 13 from the rotor 11 to the rotor 12 is determined by a time period sufficient to change the degree of vacuum in the seat 8 under the non-tight valve 1 and by the speed of the conveyer 13 movement. In order to arrange the required length of the conveyer 13, the apparatus is provided with a number of tension rollers 15 disposed downstream of the conveyer 13 movement from the rotor 11 to the rotor 12. The conveyer 13 is conjugated with the rotors 11 and 12. The tension rollers 15 mounted adjacent the rotors 11 and 12 are intended to ensure the angle of contact of the rotors 11 and 12 with the conveyor 13, which is required for the operation.

Each of the rotors 11 and 12 has a pedestal 16 (FIG. 4) made integral with a flange 17 normal thereto. The flange 17 is rigidly secured onto a stand 18 of the rotor. Mounted horizontally on the pedestal 16 near the flange 17 is a gear wheel 19 kinematically linked with the drive (not shown) of the apparatus. On the upper (according to the drawing) end of the gear wheel 19 a sleeve 20 is secured, said sleeve extending coaxially with the pedestal 16. In order to enable the rotation of the sleeve 20 about the pedestal 16, the latter is provided with bearings 21 mounted thereon whose outer races are fitted into the sleeve 20. The bearings 21 are separated from one another by a spacer 22. The upper (according to the drawing) end of the sleeve 20 bears a disc 23 attached thereto mounted whereon is a sprocket 24 which serves to link the rotor 11 with the chain 14 of the conveyer 13. The disc 23 has an opening in the center thereof whose diameter slightly exceeds that of the pedestal 16, thereby forming a circular gap between the pedestal surface and the disc 23. A drum 25 is mounted on the upper (according to the drawing) end of the pedestal 16. Between the drum 25 and the bearing 21 on the pedestal 16 there is provided a spacer 26 passing through the circular gap between the disc 23 and the pedestal 16. In order to prevent the drum 25 from turning on the pedestal 16, provision is made for a key 27 disposed in keyslots made on the surfaces of these parts. The bearings 21, spacers 22 and 26, and drum 25 are secured on the pedestal 16 by means of a nut 28 and locknut 29.

A spatial cam 30 having two profiled slots is mounted on the drum 25, enveloping the side surface of the latter. At a certain distance from the surface of the cam 30, parallel to its generatrix, there is mounted a number of columns 31 which are evenly spaced around the circumference. The columns 31 pass through openings made in the sprocket 24 and the disc 23 and are fixed in place by nuts 32 and locknuts 33. Disposed between two adjacent columns 31 one about the other are two slides 34 and 35 for which the columns 31 serve as guides. Each of the slides 34 and 35 has an opening adapted to receive a pin 36 whose protruding end bears a roller 37 each engaging its slot on the surface of the cam 30. A through opening is made in the slide 34 parallel to the column 31, in which a sleeve 38 is mounted. The lower (according to the drawing) portion of the sleeve 38 bears a spring 39 which is secured on the sleeve by means of a locking ring 40. The slide 34 together with the roller 37 and the sleeve 38 with parts mounted thereon represents means for pressing the valve to be checked against the resilient member 10 of the seat 8 mounted in the conveyer 13.

The slide 35 also has a through opening which is parallel to the column 31 and adapted to receive a plunger 41 passing through the sleeve 38 which serves as its guide. Mounted on the plunger 41 is a spring 42 secured thereon by a locking ring 43. The slide 35 together with the roller 37 and the plunger 41 with parts mounted thereon represents means for opening the valve 1. The same means serves to remove the valve 1 from the seat 8. For this purpose the lower (according to the drawing) end of the plunger 41 (FIG. 5) is made in the form of a tube 44. The outer and inner diameters of this tube are chosen so as to ensure the engagement of its end with the circular slot 7 (FIGS. 1 and 7) of the rod 3 of the valve 1. The wall of the tube 44 (FIG. 5) has through openings 45 to communicate the space of the stepped cylinder 5 with the atmosphere. In order to ensure centering of the tube 44 with respect to the valve 1, the inner diameter of the sleeve 38 in the lower portion thereof is chosen so that this portion envelops the central part of the housing 2 of the valve 1.

Located near the rotor 11 (FIG. 3) and before it with respect to the conveyer 13 movement, is a loading means from which the valves 1 to be checked are transferred onto the conveyer 13 and placed into the seats 8.

The above-mentioned means for pressing the valve 1 against the seat 8 and means for opening the valve 1 are evenly spaced around the circumference of each of the rotors 11 and 12 with a pitch equal to the distance between the seats 8 on the conveyer 13 and, when the latter moves, provide together with each seat 8 an operating position of the rotor.

Figure 6:
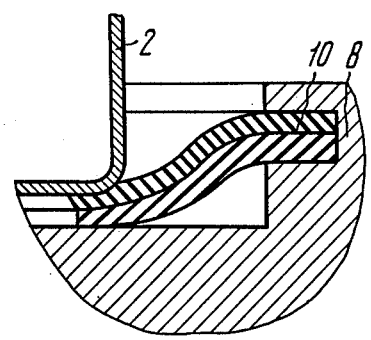
FIG. 6 is an enlarged view of position VI in FIG. 5.

The resilient member 10 (FIG. 6) disposed in the seat 8 is made as a multilayer member comprising layers of material of different elasticity, in this case of rubber of different brands. Provided in the place of contact of the resilient member 10 with the housing 2 of the valve 1 is a layer of a higher elasticity. Each seat 8 has on the inner side surface thereof a circular groove adapted for fitting therein the resilient member 10.

Figure 7:
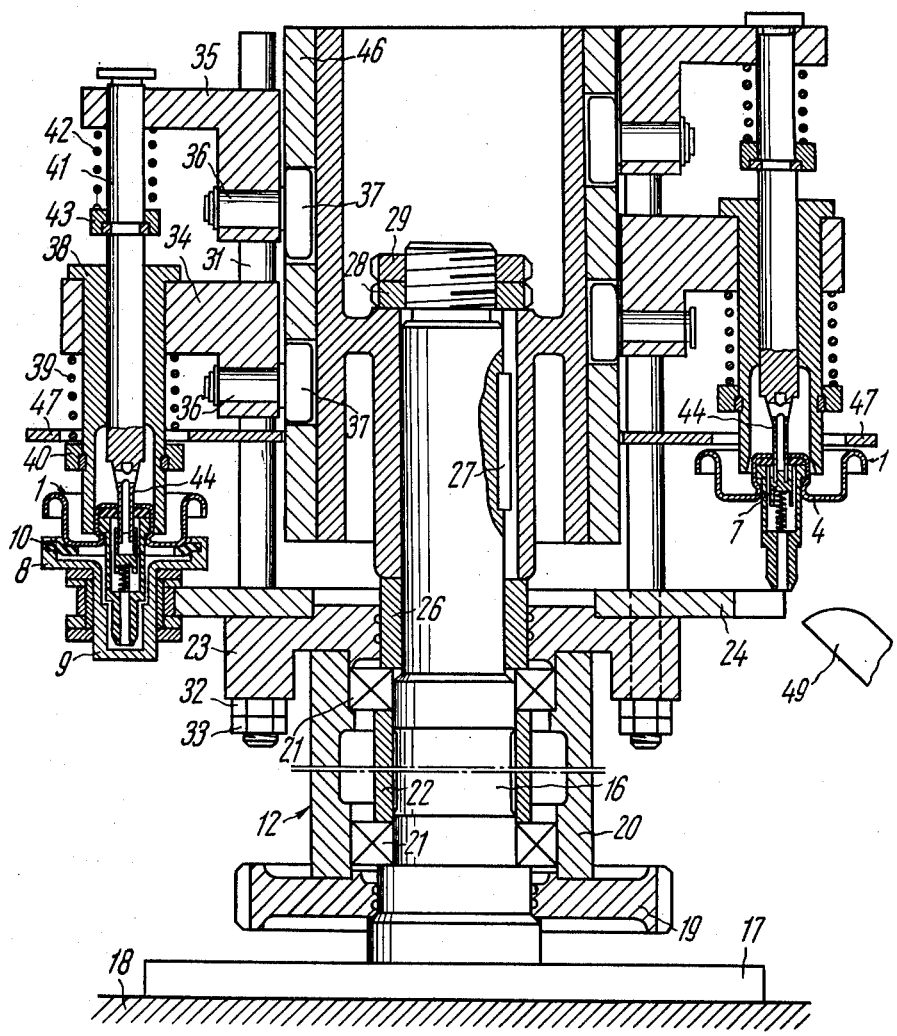
FIG. 7 is a sectional view taken along line VII—VII in FIG. 3.

The structure of the rotor 12 shown in FIG. 7 is generally the same as that of the rotor 11. However, a spatial cam 46 which is similar by its purpose and positioning in structure to the cam 30 in the rotor 11 has differently profiled slots for the rollers 37 which determine the mode of operation of the means mounted on the rotor for pressing the valve 1 against the resilient member 10 of the seat 8 and the means for opening the valve 1. In the rotor 12 the means for opening the valve 1 also serves for removing the valve from the seat 8 by engaging the end of the tube 44 with the circular slot 7 in the rod 4 of the valve 1.

In addition, the rotor 12 is provided with a disc 47 mounted parallel to the sprocket 24 and above it at a distance determined by the total height of the valve 1 and the height of the seat 8 portion protruding over the surface of the sprocket 24 during the apparatus operation.

Provided near the rotor 12 (FIG. 3), in front of it along the conveyor 13 movement, in the apparatus, is a nozzle 48 adapted to supply compressed air to the valve 1 in the seat 8 of the conveyer 13 to remove faulty valves 1.

The section of the rotor which is free from the chain 14 of the conveyer 13, has a receiving trough brought thereto into which the checked sound valves 1 are dropped.

The number of said means in the rotors 11 and 12 is determined by the dependence between the duration of the operating cycle of these means and a given productivity of the apparatus. The duration of the operating cycle of the means mounted on the rotors 11 and 12 is in turn determined by the corresponding configurations of the slots in the cams 30 and 46 (FIGS. 4 and 7).

The apparatus for checking the valves of aerosol containers for tightness operates as follows.

Figure 5:
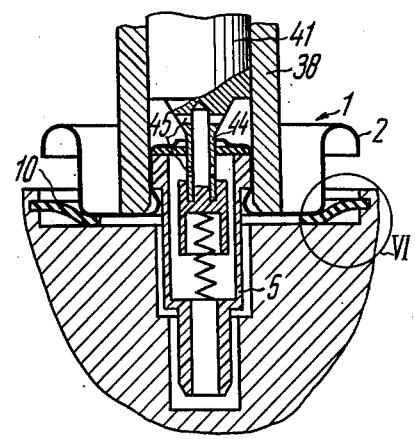
FIG. 5 is an enlarged view of position V in FIG. 4.
Figure 8:
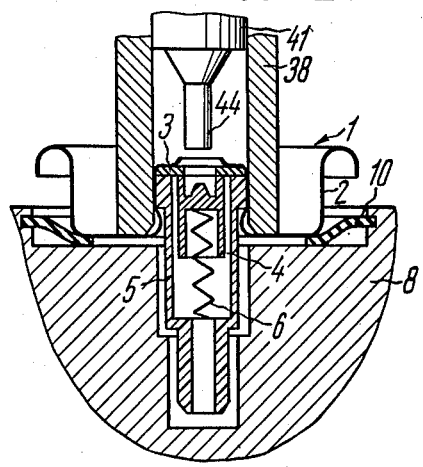
FIG. 8 shows the valve fitted on the seat of the apparatus, when it is pressed against the resilient member.

When switching-on the apparatus drive, the rotors 11 and 12 start to rotate clockwise. The sprockets 24 drive the conveyer 13 with the seats 8 into motion. At the same time, the supply of compressed air to the nozzle 48 is started. The valves 1 to be checked are placed from the loading means into the seats 8 as they pass by the loading means together with the chain 14 of the conveyer 13, then the valves 1 enter the rotor 11 and are disposed therein around the circumference of the sprocket 24, co-axially with the means for pressing each of the valves 1 against the seat 8 and the means for opening the valves 1, thereby forming the operating positions. Further the seats 8 together with the valves 1 being checked are moved jointly with the rotor 11 over the section of its circumference which is enveloped by the chain 14 of the conveyer 13. At the moment when the seats 8 enter the rotor 11, the rollers 37 pass along the horizontal sections of the slots of the cam 30, this preventing the slides 34 and 35 from moving along the columns 31. After the seats 8 start their joint movement with the rotor 11, the rollers 37 are transferred to the curved sections of slots of the cam 30. As a result, the slides 34 and 35 are moved downwardly along the columns 31 displacing the corresponding sleeve 38 and plunger 41. First the sleeve 38 being lowered down contacts the housing 2 of the valve 1, centers the valve 1 relative to the plunger 41, and by the force of the spring 39 presses the valve 1 against the resilient member 10 of the seat 8, deforming the resilient member 10. The valve 1 being checked takes the position shown in FIG. 8. As a result, the upper (according to the drawing) elastic layer of the resilient member 10 is in tight contact with the housing 2 of the valve 1, completely isolating the cavity of the seat 8 under the valve 1 from the atmosphere. The air in this cavity is compressed due to reducing the volume thereof. In order to remove excessive air from the cavity, the tube 44 of the plunger 41 enters the opening of the sealing ring 3 in the course of its downward displacement and, pressing the stem 4 by the force of the spring 42, opens the valve (FIG. 5). The air passes from the cavity seat 8 under the valve 1 through the openings 45 in the tube 44. After the pressure in the seat cavity becomes equal to the atmospheric pressure, the plunger 41 is lifted upward in accordance with the configuration of the upper (in the drawing) slot of the cam 30 and the valve 1 closes as shown in FIG.

Figure 9:
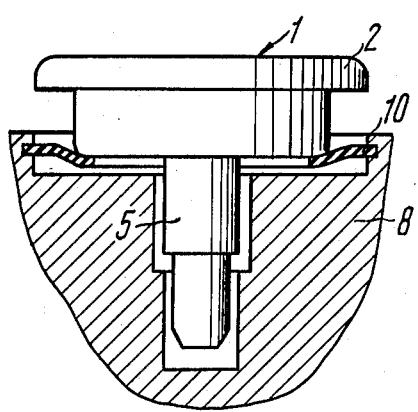
FIG. 9 shows the valve pressed against the resilient member by the atmospheric pressure.
Figure 11:
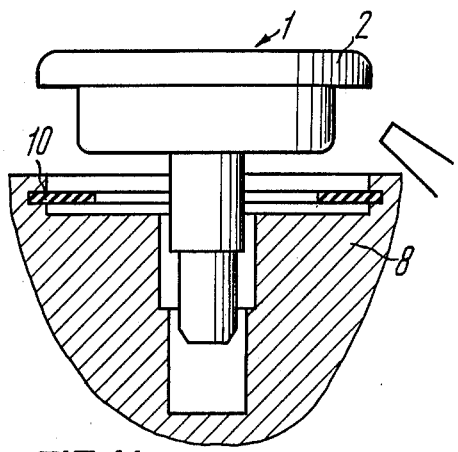
FIG. 11 shows the faulty valve at the moment when it is extracted from the seat.
Figure 12:
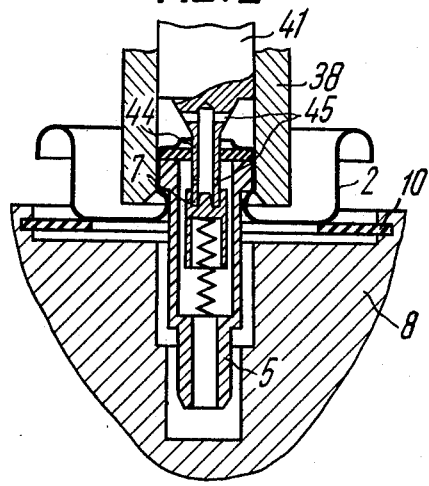
FIG. 12 shows the sound valve at the moment of opening its shut-off member prior to the valve extraction from the seat.
Figure 13:
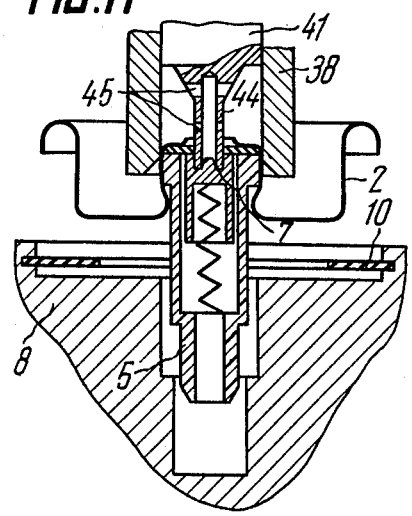
FIG. 13 shows the sound valve at the moment of its extraction from the seat.

8. During these operations the sleeve 38 continues to press the valve 1 against the resilient member 10 of the seat 8. Upon closing the valve 1, the sleeve 38 is moved upward in accordance with the configuration of the lower (in the Figure) slot of the cam 30 and relieves the valve 1. The deformed resilient member 10 (FIG. 9) tends to take its initial position and slightly lifts the valve 1. As a result, the volume of the seat 8 cavity under the valve 1 is somewhat increased and vacuum is created in this cavity. Acted upon by the atmospheric pressure, the valve 1 remains tightly pressed against the resilient member 10 of the seat 8. The sequence of operations which are accomplished by the means mounted on the rotor 11 is shown in the cyclogram of FIG. 10. This cyclogram represents a scanning over the side surface plane of the cam 30, on which surface the slots are made whose configurations define the mode of operation for the means for pressing the valve 1 against the resilient member 10 and for opening the valve 1. Further the seats 8 leave the rotor 11 and are moved by the conveyer 13 toward the rotor 12. The length of this section of the conveyer 13 is sufficient to provide a time during which the pressure in the cavity 9 under the valve 1 becomes equal to the atmospheric pressure or approaches it if the valve 1 is faulty. The atmospheric pressure force which presses the valve 1 against the resilient member 10 of the seat 8 then becomes considerably reduced. The faulty valve 1, passing together with the conveyer 13 by the nozzle 48 (FIG. 3), is blown off by the compressed air jet expelled from the nozzle. The sound valves 1 remain in the seats 8 are conveyed to the rotor 12 (FIG. 7) and enter the rotor being disposed around the circumference of the sprocket 24 and co-axially with the means mounted on the rotor for pressing the valve 1 against the resilient member 10 of the seat 8 and for opening the valve 1. Then the seats 8 with the sound valves 1 on the conveyer 13 are moved together with the rotor 12 over the section of its circumference which is enveloped by the chain 14 of the conveyer 13 (FIG. 14). At the moment of engagement of the seats 8 with the rotor 12, the rollers 37 pass along the horizontal sections of the cam 46, whereby the slides 34 and 35 are not shifted along the columns 31. When the seats 8 start to move together with the rotor 12, the rollers 37 pass over to the curved sections of the slots of the cam 46. As a result, the slides 34 and 35 are shifted downward along the columns 31 thereby displacing the corresponding sleeve 38 and plunger 41. First the sleeve 38, being lowered down, contacts the housing 2 of the valve 1 and center the latter with respect to the plunger 41, not pressing the valve 1 against the resilient member 10. In accordance with the configuration of the lower (in the Figure) slot of the cam 46 the sleeve 38 remains in this position, while the plunger 41 continues its downward movement in accordance with the configuration of the upper (in the Figure) slot of the cam 46. As the plunger 41 moves downward the tube 44 enters the opening of the sealing ring 3 and opens the valve 1 by depressing the stem 4. In so doing, the end of the tube 44 enters in a tight relationship into the circular slot 7 (FIG. 12) of the stem 4. Through the openings 45 of the tube 44 air passes into the cavity of the seat 8 under the valve 1 until the pressure therein becomes equal to the atmospheric pressure; at zero pressure differential the resilient member 10 tends to take its initial position and lifts the valve. Then the plunger 41 and sleeve 38 start their upward movement. Owing to the tight contact between the tube 44 end and the circular slot 7 surface, the valve 1 is held on the tube 44 end (FIG. 13) and lifted together with the plunger 41, parting with the resilient member 10 of the seat 8. Upon extracting the valve 1 from the seat 8, the conveyer 13 goes out from the rotor 12 and is again moved toward the rotor 11 to the next cycle of the apparatus operation, while the valve 1 continues to be lifted together with the sleeve 38 and plunger 41 until it thrusts with its housing 2 against the surface of the disc 47. After that the plunger 41 and sleeve 38 continue their upward movement and the end of the tube 44 becomes disengaged with the circular slot 7. The valve 1 is released and dropped into the trough 49 for the sound valves 1.

The sequence of operations accomplished by the means mounted on the rotor 12 is depicted in the cyclogram of FIG. 14. This cyclogram represents a scanning over the lateral surface of the cam 46, on which surface the slots are made whose configurations define the mode of operation of these means.

What is claimed is:

1. A leak tester for aerosol valves comprising an endless chain conveyor travelling along a pre-set closed path in a horizontal plane, said conveyor having blind seats for accommodating aerosol valves to be tested, means for introducing said aerosol valves onto said seats, resilient elements on said seats on which said valves are seated, a turnable drum movable along a circular path which coincides in part with the path of the chain conveyor, means mounted on said turnable drum for travelling therewith and cooperating with said valves for pressing said valves individually against respective resilient elements to form a sealed condition of said valves against said seats so that said resilient elements are deformed, means for opening said valves, cam means operatively coupled to the valve opening means and the valve pressing means first for opening the valves when they are sealed against said seats so that atmospheric pressure is established in said seats beneath said valves whereby the air pressure on the resilient elements is equalized and second for releasing the valve pressure means after the valves closing so that the pressure of the valves on the resilient elements is reduced and the latter elastically tend to return to their initial undeformed positions and carry the valves therewith to establish a suction in the seats below the valves and thereby a pressure differential on the valves tending to hold the valves on the seats, means downstream of said turnable drum for directing a jet of compressed fluid against said valves, said pressure differential being sufficient to cause the intact valves to withstand the jet of compressed fluid applied against the valves, said valves, if defective, permitting leakage of air beneath the seats to diminish the pressure differential and permit dislodging of the valves under the jet of compressed fluid, hopper means for receiving dislodged faulty valves, means downstream of said hopper means for re-opening said intact valves to permit atmospheric air to flow into said seats and cancel the pressure differential, means for removing the valves whose pressure differential has been cancelled, a second turnable drum movable along a circular path coinciding in part with a portion of the path of the chain conveyor downstream of the said hopper means; said means for re-opening the intact valves being mounted on the second drum.

2. A leak tester for aerosol valves comprising an endless chain conveyor travelling along a pre-set closed path in a horizontal plane, said conveyor having blind seats for accommodating aerosol valves to be tested, means for introducing said aerosol valves onto said seats, resilient elements on said seats on which said valves are seated, a turnable drum movable along a circular path which coincides in part with the path of the chain conveyor, means mounted on said turnable drum for travelling therewith and cooperating with said valves for pressing said valves individually against respective resilient elements to form a sealed condition of said valves against said seats so that said resilient elements are deformed, means for opening said valves, cam means operatively coupled to the valve opening means and the valve pressing means first for opening the valves when they are sealed against said seat so that atmospheric pressure is established in said seats beneath said valves whereby the air pressure on the resilient elements is equalized and second for releasing the valve pressing means after the valves closing so that the pressure of the valves on the resilient elements is reduced and the latter elastically tend to return to their initial undeformed positions and carry the valves therewith to establish a suction in the seats below the valves and thereby a pressure differential on the valves tending to hold the valves on the seats, means downstream of said turnable drum for directing a jet of compressed fluid against said valves, said pressure differential being sufficient to cause the intact valves to withstand the jet of compressed fluid applied against the valves, said valves, if defective, permitting leakage of air beneath the seats to diminish the pressure differential and permit dislodging of the valves under the jet of compressed fluid, and hopper means for receiving dislodged valves.

3. A leak tester as claimed in claim 2 comprising means downstream of said hopper means for re-opening intact valves to permit atmospheric air to flow into said seats and cancel the pressure differential, and means for removing the valves whose pressure differential has been cancelled.

4. A leak tester as claimed in claim 3 comprising a second turnable drum movable along a circular path coinciding in part with a portion of the path of the chain conveyor downstream of the first drum; said means for re-opening the valves being mounted on the second drum.

5. A leak tester as claimed in claim 2 wherein said chain conveyor includes links with interconnecting support members, said support members being provided with said seats for said valves, said seats each being in the form of a cavity closed at one end and consisting of a narrow and broad portion, said resilient elements each being provided in the middle of said broad portion of a seat and being in the form of a ring fabricated from rubber.

6. A leak tester as claimed in claim 2 comprising vertically reciprocable members carried by said drum, each of said vertically reciprocable members being associated with a respective said valve pressing means, and further vertically reciprocable members carried by said drum, each of said further vertically reciprocable members being associated with a respective valve opening means, a sprocket on said drum drivingly coupled to said conveyor, said valve pressing means comprising sleeves, said valve opening means comprising plungers accommodated within said sleeves.

7. A leak tester for aerosol valves comprising an endless chain conveyor travelling along a pre-set closed path in a horizontal plane, said conveyor having blind seats for accommodating aerosol valves to be tested, means for introducing aerosol valves to be tested onto said seats, resilient elements on said seats on which said valves are seated, a first turnable drum movable along a circular path which coincides in part with the path of the chain conveyor, means mounted on said turnable drum for travelling therewith and cooperating with said valves for pressing said valves individually against respective resilient elements to form a sealed condition of said valves against said seats so that said resilient elements are deformed, means for opening said valves, means operatively coupled to the valve opening means and the valve pressing means first for opening the valves when they are sealed against said seat so that atmospheric pressure is established in said seats beneath said valves whereby the air pressure on the resilient elements is equalized and second for releasing the valve opening means so that the valves are closed and then releasing the valve pressing means after valve closing so that the pressure of the valves on the resilient elements is reduced and the latter elastically tend to return to their initial undeformed positions and carry the valves therewith to establish a suction in the seats below the valves and thereby a pressure differential on the valves tending to hold the valves on the seats, said valves being transported by said conveyor beyond said drum over a path of a sufficient distance to allow defective valves to leak air beneath the seats to reduce the suction in the seats, means located at the end of said path for removing the defective valves in response to reduced suction in the seats, a second turnable drum located downstream of the defective valve removal means for receiving intact valves therefrom, and means on said second drum for engaging the intact valves for first re-opening said intact valves for breaking the suction in the seats and then for removing the valves from said seat.

8. A leak tester as claimed in claim 7 wherein said seats are equally spaced in said endless horizontal conveyor, said valve pressing means and said valve opening means on said first drum each comprising a plurality of vertical reciprocable members; said reciprocable members being equally spaced on the periphery of said first drum, said durm being engaged by said conveyor so that a first zone of engagement is created, where said seats and said valves are placed in alignment with said vertical reciprocatory members and thereunder, said valve re-opening means on said second drum comprising a plurality of second vertical reciprocable members for re-opening the intact valves and removing them from said seats; said second members being equally spaced on the periphery of said second drum; said second drum being engaged by said conveyor so that a second zone of engagement is created where said seats with the intact valves are placed in alignment with said second vertical reciprocatory members and thereunder.

9. A leak tester as claimed in claim 7 wherein each said drum comprises a stationary cylindrical cam with annular upper and lower slots and a rotatable sprocket; vertical columns mounted on the periphery of said sprocket and connected therewith; upper and lower slides placed in pairs one above the other between each two adjacent columns, which serve as guides therefor; each said slide having a roller follower; each said follower being placed in a respective slot of said cam, whereby said slides receive vertical reciprocable movement when said sprocket rotates; each said valve pressing means comprising a biassed sleeve, each said lower slide carrying the biassed sleeves; each said valve opening means comprising a biassed plunger slidably accommodated in a respective sleeve, each said upper slide carrying the biassed plungers, said sprocket being engaged with said conveyor such that said seats with said valves are placed in alignment with said sleeves and said plungers and under them; the lower part of said sleeve being capable of aligning said valve in said seat with said plunger.

* * * * *